Jan. 19, 1960  D. F. WHITE ET AL  2,922,144
READ-RECORD CIRCUITS
Filed March 1, 1954

INVENTOR
Donald F. White.
William H. Reinholtz.
BY
Howard M. Dustin

United States Patent Office 2,922,144
Patented Jan. 19, 1960

2,922,144

READ-RECORD CIRCUITS

Donald F. White, Oakland, and William H. Reinholtz, Berkeley, Calif., assignors to Smith-Corona Marchant Inc., a corporation of New York Application March 1, 1954, Serial No. 413,388

3 Claims. (Cl. 340—174)

This invention relates to recirculation devices for magnetic memories, and more particularly to the simplification of such devices by the utilization of a single trigger circuit in cooperation with two magnetic transducers.

It is a principal object of the present invention to provide a device for reading a signal from a magnetic storage medium and rewriting the signal on the same, or another storage medium, employing a single trigger circuit in combination with a magnetic reading transducer and a magnetic writing transducer.

Another object of the invention is to provide a device which reduces the number and cost of the elements required to recirculate signals stored on a magnetic recording medium.

Another object of the invention is to provide means employing a magnetic reading transducer as the sole data recirculation control for a trigger circuit recirculation device.

Another object of the invention is to employ each of the two outputs of a trigger circuit to induce a respective pulse in a magnetic transducer.

Other objects of the present invention will appear in the following description, reference being made to the accompanying drawings, wherein.

While a bi-stable trigger circuit having triode vacuum tubes is herein disclosed to illustrate the present invention, the application of the following principle to other types of bi-stable circuits will achieve comparable results.

The present invention is based upon the principle of applying a pulse, which is induced in a reading transducer, directly in an input of a single trigger circuit, the output of which is applied directly to a writing transducer.

CIRCUIT DESCRIPTION

*Bi-stable trigger circuit*

The present invention employs a bi-stable trigger circuit which receives binary signals from a magnetic reading transducer and transmits these signals to a magnetic writing transducer, where they are rewritten.

Figure 1:
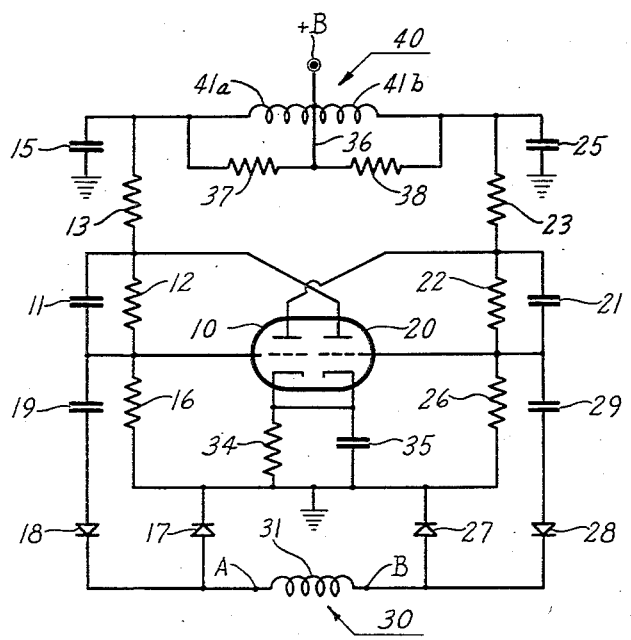
Fig. 1 is a circuit diagram of a preferred form of the recirculation device.

Fig. 1 shows a typical trigger circuit in which each of a pair of triode vacuum tubes 10 and 20 has its grid cross-coupled to the anode of the other by a respective capacitor 11 or 21 in parallel with a respective resistor 12 or 22. The tube cathodes are coupled to ground through a resistor 34, in parallel with a capacitor 35. The anode of each tube is connected to a high potential source +B through a respective resistor 13 or 23, which is in series with one or the other half 41a or 41b of the coil of a writing head 40. A respective resistor 37 or 38 is connected in parallel with each half of the writing head coil. A respective capacitor 15 or 25 is connected to ground from a point between each resistor 13 and 23 and the related half 41a or 41b of the writing head.

The grid bias voltage of each tube is derived from a respective voltage dividing network, which in the case of tube 10 comprises resistor 13 and a pair of resistors 12 and 16, and in the case of the tube 20 comprises resistor 23 and a pair of resistors 22 and 26. The trigger circuit has input connections through capacitors 19 and 29 connected to respective grids. Negative pulses induced in a reading head 30 are applied to each input connection through a passive coupling including respective unidirectional conductors or diode rectifiers 18 and 28. The opposite ends of the reading head are connected to ground through respective diode rectifiers 17 and 27.

It has been arbitrarily established that when tube 10 is conducting it represents the digit "0," and when tube 20 is conducting it represents the digit "1." The system of magnetic representation employed in this invention is such that "1's" and "0's" are represented on a moving magnetic medium by areas that are magnetized in opposite directions of polarity, and it has been arbitrarily established that an area which is saturated in the direction which induces a negative leading pulse at a terminal A (Fig. 1) is a "1" area, and one that induces a negative leading pulse at a terminal B is a "0" area.

Figure 3:
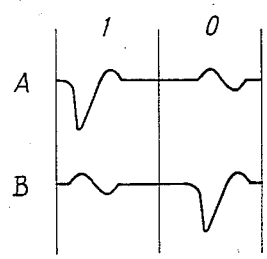
Fig. 3 is a chart showing voltage wave forms at specified points in the circuit illustrated in Fig. 1.

On the basis of these arbitrary selections, assume for the moment that the trigger circuit stands in a "0" condition and that a "1" area is detected on the medium by the reading head 30. This detection produces distinctive wave forms at terminals A and B (Fig. 1) as shown in Fig. 3. The cause and effect of these waves will be discussed in more detail in the description of the reading head, but for the purposes of the description of the trigger circuit, it will be sufficient to understand that a "1" area produces at terminal A a leading negative and a trailing positive pulse and simultaneously at terminal B, a leading positive pulse and a trailing negative pulse.

The diodes 17 and 18 are oriented such that the leading negative pulse at A passes through diode 18 to the input or control grid of tube 10, cutting it off and causing tube 20 to conduct, whereas the trailing positive pulse of the wave form at terminal A passes through diode 17 and is shunted to ground. The diodes 27 and 28 are oriented such that the leading positive pulse produced at terminal B passes through diode 27 and is shunted to ground; consequently the counter E.M.F. which produces the trailing negative pulse is negligible, and even though this negative pulse passes through diode 28 to the grid of tube 20, its amplitude is not sufficient to cut off tube 20, which therefore remains in its "1" state. From the foregoing, it will become apparent that if, conversely, the trigger circuit is in a "1" condition and a "0" area is detected, the symmetrical input will cause the trigger circuit to reverse to its "0" condition, and that if the trigger circuit is in the same condition, "1" or "0," as the representation "1" or "0" of the detected area on the magnetic medium, the condition or state of the trigger circuit will not change. The cross-coupled bi-stable trigger circuit employed by applicants is a modification of the standard Eccles-Jordan vacuum tube trigger circuit, fully described in "Theory and Application of Electron Tubes" by H. J. Reich. As previously mentioned, other types of bi-stable circuits may be employed. Also, if it is desirable to trigger the bi-stable device with positive pulses, then diodes 17, 18, 27, and 28 may be reversed to obtain input pulses of positive polarity.

Reading head

Figure 2:
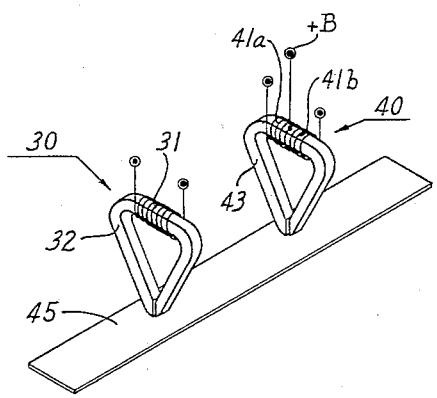
Fig. 2 is a perspective view of the reading and writing transducers and the magnetic medium.

The aforementioned trigger circuit is controlled by the reading head, or transducer 30 (Fig. 2) which is composed of a coil 31 and a core 32. A gap in the core is positioned adjacent a magnetic medium 45 which may be a drum, disk, endless tape or any other form of signal retention medium.

When a magnetized area on the magnetic medium passes adjacent the reading head 30 (Fig. 1) a voltage is induced in coil 31, and if this area is magnetized in the direction that represents a binary "1," the wave form (a double-ended pulse) shown at A–1 (Fig. 3) appears at terminal A (Fig. 1) and simultaneously a wave form of opposite polarity, shown at B—1, appears at terminal B. Rectifier 18 passes only negative pulses from terminal A, and rectifier 17 passes only positive pulses from terminal A; consequently the negative pulse at terminal A is applied to the grid of tube 10 and reverses the trigger circuit as previously described. The counter E.M.F. resulting from this negative pulse would normally produce a trailing positive pulse of substantially equal amplitude, but the rise of this pulse above a negligible amount is prevented by providing a low impedance path for positive pulses from terminal A through rectifier 17, directly to ground.

The wave form of opposite polarity, shown at B–1 (Fig. 3), that simultaneously appears at terminal B has a leading positive pulse, and since rectifier 27 passes positive pulses from terminal B, this leading positive pulse is shunted directly to ground and never rises above a negligible amount. The resulting counter E.M.F. is also negligible and consequently produces a correspondingly negligible trailing negative pulse. In other words, the reading head winding is effectively short circuited for positive potential rise at either terminal A or B and thus, since the self-inductance of the winding is large compared to the pulse time, there is but a small flux build up in the core 32. Therefore, when this flux falls it produces only a negligible trailing negative pulse which, although it passes through rectifier 28 to the grid of tube 20, has no effect upon the conduction of that tube.

A magnetized area representing a binary "0" induces the wave form at terminals A and B as shown at A–0 and B–0 (Fig. 3), and reverses the trigger circuit from "1" to "0" in a manner similar to that described above, but by applying a negative pulse to the grid of tube 20. This will be evident by noting that by means of the network of diode rectifiers described above, three of the four pulses induced at terminals A and B for either a 1 or 0 area are suppressed and only one substantial negative pulse in either case is rendered effective to reverse the trigger circuit when applied to the conducting tube. When the trigger circuit and magnetized area represent the same binary number, however, the substantial negative pulse is applied to the tube which is at that time extinguished and therefore no change in the state of the trigger circuit is effected.

Writing head

A magnetic writing head is used in the present invention to rewrite the original "0" or "1" signal on the magnetic medium. The writing head is shown in Fig. 1 as comprising the two havles 41a and 41b of a single coil; however, it is to be understood that the head may comprise two separate coils. The two sides of the writing head will hereinafter be referred to as coils 41a and 41b, respectively.

As previously described, the anode of each tube 10 and 20 is connected to +B through a respective resistor 13 and 23 and a respective one of the coils 41a and 41b, each resistor 13 and 23 also forming part of a respective voltage dividing network. The voltage divider networks comprise resistors 13, 12 and 16 connected in series to ground on the "0" side of the trigger circuit and resistors 23, 22, and 26 on the "1" side. Thus there is a current flow from +B through each coil 41a and 41b and through the respectively associated divider network to ground. The two network currents are equal since the networks are of equal total resistance and, since these currents flow in opposite directions through the coils 41a and 41b, it will be apparent that the flux developed in the core 43 by one of the divider currents is effectively cancelled by the flux developed in the core by the other divider current. Therefore, when tube 10 is conducting, representing a "0," there is current flow through coil 41b not only for supplying voltage divider current through resistors 22 and 26 to ground, but also for supplying anode current to tube 10. On the other hand, the only current flow through coil 41a is for supplying voltage divider current through resistors 12 and 16 to ground. Conversely, when tube 20 is conducting, representing a "1," a relatively large current flows through coil 41a and a relatively small current flows through coil 41b.

It will be noted from the above description that the currents flowing through coils 41a and 41b are in opposite directions; therefore, these currents produce magnetic flux of opposite direction in the core 43. The flux is employed to magnetize the underlying medium in a corresponding direction. The circuit parameters are such that when anode current is flowing through a given coil 41a or 41b, the magnetic flux which it produces is of sufficient strength to magnetize the underlying area of the medium. Thus, when the reading head causes the trigger circuit to conduct on its "0" or "1" side, the relatively high current flow through the related coil 41a or 41b produces a flux in the core 43 which magnetizes the underlying medium in a corresponding direction of polarity, thereby rewriting the representation of the "0" or "1."

When the trigger circuit is reversed from one state to the other, the rapid change in the current flow through coils 41a and 41b produces high back voltages which tend to cause oscillations in the voltages across these coils. The resistors 37 and 38, which are connected in parallel with coils 41a and 41b, respectively, tend to dampen these oscillations and produce a steady current flow.

We claim:

1. In a calculating machine, the combination of: a moving magnetic medium having areas thereof magnetized in either of two conditions of magnetization to represent either of two respective values; a device having two stable states of operation, each representing a respective one of said values; a pair of input connections to said device for receiving respective signals representative of said values; a reading transducer responsive to the passage of a magnetized area of said medium adjacent thereto for developing a waveform characterized by a leading pulse of one polarity and a trailing pulse of opposite polarity; a winding for said transducer having a pair of terminals; means for substantially suppressing the trailing negative pulses and the leading and trailing positive pulses, including said winding and a first pair of unidirectional conductors each connecting a respective one of said pair of terminals of the winding to ground potential; a second pair of unidirectional conductors each connecting a respective one of said pair of terminals to a corresponding input connection of said device and each oriented to conduct only negative pulses to said corresponding input connection of said device for causing the state of said device to correspond to the condition of magnetization of the area of the medium adjacent to the reading transducer; a writing transducer disposed adjacent the medium; and a passive connection from said device to the writing transducer for causing the latter to magnetize, to a condition corresponding to the state of said device, that area of the medium most nearly adjacent the writing transducer.

2. In a calculating machine, the combination of: a moving magnetic medium having areas thereof magnetized in either of two directions to represent either of two respective values; a device having two stable states of operation each representing a respective one of said values; a pair of input connections to said device for receiving respective signals representative of said values; a reading transducer disposed adjacent the path of said medium; a pair of terminals for said transducer; a first pair of unidirectional conductors each connecting a respective one of said pair of terminals to ground potential for substantially preventing positive potential rise at either of said terminals; a second pair of unidirectional conductors each connecting a respective one of said pair of terminals to a corresponding input connection of said device for transmitting negative potential rise at either of said terminals to the corresponding input connection of said device for causing the state of said device to correspond to the direction of magnetization of the area of the medium adjacent to the reading transducer.

3. In a calculating machine, the combination of: a moving magnetic medium having areas thereof magnetized in either of two conditions of magnetization to represent either of two respective values; a device having two stable states of operation each representing a respective one of said values; a pair of input connections to said device for receiving respective signals representative of said values; a reading transducer responsive to the passage of a magnetized area of said medium adjacent thereto for developing a waveform characterized by a leading pulse of one polarity and a trailing pulse of opposite polarity; a winding for said transducer having a pair of terminals; means for substantially suppressing trailing positive pulses and leading and trailing negative pulses including a first pair of unidirectional conductors each connecting a respective one of said pair of terminals to ground potential; and a second pair of unidirectional conductors each connecting a respective one of said pair of terminals to a corresponding input connection of said device and each oriented to conduct only positive pulses to said corresponding input connection for causing the state of said device to correspond to the condition of magnetization of the area of the medium adjacent to the reading transducer.

References Cited in the file of this patent

UNITED STATES PATENTS

| | | |
|---|---|---|
| 2,609,143 | Stibitz | Sept. 2, 1942 |
| 2,698,427 | Steele | Dec. 28, 1954 |
| 2,700,148 | McGuigan et al. | Jan. 18, 1955 |
| 2,764,463 | Lubkin et al. | Sept. 25, 1956 |

OTHER REFERENCES

Publication, Review of In-Out Equip. in Comp. Joint AIEE-IRE-ACM Computer Cont., March 1953, pp. 90–91.